United States Patent
Kang et al.

(10) Patent No.: US 12,206,810 B2
(45) Date of Patent: Jan. 21, 2025

(54) ROLL-SLIDE MOBILE TERMINAL

(71) Applicant: LG ELECTRONICS INC., Seoul (KR)

(72) Inventors: Timothy Kang, Seoul (KR); In Su Song, Seoul (KR); Sung Lyong Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 398 days.

(21) Appl. No.: 17/633,167

(22) PCT Filed: Aug. 6, 2019

(86) PCT No.: PCT/KR2019/009798
§ 371 (c)(1),
(2) Date: Feb. 4, 2022

(87) PCT Pub. No.: WO2021/025198
PCT Pub. Date: Feb. 11, 2021

(65) Prior Publication Data
US 2022/0303373 A1 Sep. 22, 2022

(51) Int. Cl.
*H04M 1/02* (2006.01)
(52) U.S. Cl.
CPC ....... *H04M 1/0268* (2013.01); *H04M 1/0237* (2013.01)
(58) Field of Classification Search
None
See application file for complete search history.

(56) References Cited

U.S. PATENT DOCUMENTS

| | | | | |
|---|---|---|---|---|
| 1,749,197 A | * | 3/1930 | Stuart | E04F 10/0651 160/68 |
| 3,074,474 A | * | 1/1963 | Dunn | E04F 10/0651 160/310 |

(Continued)

FOREIGN PATENT DOCUMENTS

| | | | | |
|---|---|---|---|---|
| CN | 106971673 | | 7/2017 | |
| CN | 108520702 A | * | 9/2018 | G09F 9/301 |

(Continued)

OTHER PUBLICATIONS

English translation of KR 20160141255 (Year: 2024).*

(Continued)

*Primary Examiner* — Gennadiy Tsvey
(74) *Attorney, Agent, or Firm* — LEE, HONG, DEGERMAN, KANG & WAIMEY (57) ABSTRACT

Provided is a roll-slide mobile terminal in which a front area of a flexible display unit is variable, for solving a problem of an electric field portion narrowing due to a structure for the variation of the front area, the roll-slide mobile terminal comprising a first frame, a second frame sliding in a first direction with respect to the first frame, the flexible display unit, a first guide rail fixed to the first frame to be parallel to the front area of the flexible display unit and provided in a second direction perpendicular to the first direction, a first slider moving in the second direction along the first guide rail, and a link rotatably fastened to each of the first slider and the second frame to move the second frame according to movement of the first slider.

12 Claims, 9 Drawing Sheets

(56) References Cited

U.S. PATENT DOCUMENTS

| | | | | |
|---|---|---|---|---|
| 4,262,373 | A * | 4/1981 | Chambers | E04H 4/101 160/342 |
| 4,915,496 | A * | 4/1990 | Stine | G03B 21/56 359/450 |
| 5,121,977 | A * | 6/1992 | Weisgerber | G03B 21/56 359/450 |
| 5,602,821 | A * | 2/1997 | McPherson | G11B 17/22 414/280 |
| 7,310,050 | B2 * | 12/2007 | Yeh | G06F 1/1656 345/905 |
| 8,493,726 | B2 * | 7/2013 | Visser | G09F 9/301 361/679.05 |
| 9,823,697 | B2 * | 11/2017 | Hsu | G06F 1/1624 |
| 10,410,549 | B1 * | 9/2019 | Kim | G09F 9/301 |
| 10,448,521 | B2 * | 10/2019 | Seo | H05K 1/0203 |
| 10,534,402 | B1 * | 1/2020 | Kim | H05K 1/118 |
| 2011/0132557 | A1 * | 6/2011 | Kuroi | G03B 21/58 160/368.1 |
| 2012/0200915 | A1 * | 8/2012 | Kuroi | G03B 21/58 359/443 |
| 2013/0058063 | A1 * | 3/2013 | O'Brien | G06F 1/1624 361/807 |
| 2015/0116921 | A1 * | 4/2015 | Hsu | G06F 1/1624 361/679.27 |
| 2015/0325804 | A1 * | 11/2015 | Lindblad | H10K 59/40 313/511 |
| 2016/0147261 | A1 * | 5/2016 | Bohn | G06F 1/1652 455/566 |
| 2017/0123536 | A1 * | 5/2017 | Aurongzeb | G06F 1/1652 |
| 2017/0212556 | A1 * | 7/2017 | Jovanovic | G06F 1/1652 |
| 2018/0014417 | A1 | 1/2018 | Seo et al. | |
| 2018/0070466 | A1 * | 3/2018 | Kim | B65H 16/06 |
| 2018/0103552 | A1 * | 4/2018 | Seo | H05K 5/0017 |
| 2018/0114471 | A1 * | 4/2018 | Park | G06F 1/1652 |
| 2018/0160554 | A1 * | 6/2018 | Kang | H05K 5/0017 |
| 2019/0141849 | A1 | 5/2019 | Xu et al. | |
| 2019/0268455 | A1 * | 8/2019 | Baek | G06F 1/1652 |
| 2019/0278335 | A1 * | 9/2019 | Yeh | G09F 9/301 |
| 2019/0324501 | A1 * | 10/2019 | Kim | H05K 5/0017 |
| 2020/0060028 | A1 * | 2/2020 | Kim | H10K 50/84 |
| 2020/0135064 | A1 * | 4/2020 | Lee | G06F 1/1684 |
| 2020/0314225 | A1 * | 10/2020 | Ahn | G06F 1/1652 |
| 2021/0044683 | A1 * | 2/2021 | He | G06F 1/1652 |
| 2022/0155823 | A1 * | 5/2022 | Shin | G09F 9/301 |

FOREIGN PATENT DOCUMENTS

| | | | | |
|---|---|---|---|---|
| CN | 109510639 | A * | 3/2019 | H04B 1/3838 |
| KR | 200374460 | | 1/2005 | |
| KR | 100973299 | | 7/2010 | |
| KR | 1020160013289 | | 2/2016 | |
| KR | 20160141255 | | 12/2016 | |
| KR | 1020170025520 | | 3/2017 | |
| KR | 20170116551 | A * | 10/2017 | |
| KR | 1020180006533 | | 1/2018 | |
| KR | 1020180107065 | | 10/2018 | |
| KR | 1020190086305 | | 7/2019 | |
| WO | 2018120086 | | 7/2018 | |
| WO | WO-2020211948 | A1 * | 10/2020 | G06F 1/1624 |

OTHER PUBLICATIONS

Korean Intellectual Property Office Application No. 10-2022-7007472, Office Action dated Aug. 8, 2023, 6 pages.
PCT International Application No. PCT/KR2019/009798, International Search Report dated May 7, 2020, 2 pages.
European Patent Office Application Serial No. 19940390.8, Search Report dated Apr. 3, 2023, 8 pages.

* cited by examiner

ROLL-SLIDE MOBILE TERMINAL

CROSS-REFERENCE TO RELATED APPLICATIONS

This application is the National Stage filing under 35 U.S.C. 371 of International Application No. PCT/KR2019/009798, filed on Aug. 6, 2019, the contents of which are all incorporated by reference herein in its entirety.

TECHNICAL FIELD

The present disclosure relates to a motile terminal, and to a roll-slide mobile terminal having a flexible display capable of expanding the size of a screen.

BACKGROUND ART

A display device is a device having a function of receiving, processing and displaying an image that a user may watch. For example, the display device receives a broadcast selected by a user among broadcast signals transmitted from a broadcast station, separates an image signal from the received signals, and again displays the separated image signal on a display.

Recently, due to the development of broadcasting technology and network technology, functions of the display device have also diversified considerably, and performance of the device has been improved accordingly. That is, display devices have been developed to provide not only broadcast contents but also various other contents to user. For example, the display devices may provide not only program received from a broadcasting station but also game play, music listening, Internet shopping, user-customized information, and the like using various applications. In order to perform such extended functions, a display device is basically connected to other devices or networks using various communication protocols, and may provide a user with ubiquitous computing environment. That is, the display device has evolved into a smart device that enables connectivity to a network and the ubiquitous computing.

Along with this, as network technology develops and infrastructure expands in recent years, many tasks or specialized tasks may be performed on display devices or smart devices. Accordingly, a display device having a large screen has become a form corresponding to this. However, existing large screen display device has a problem in that it is not suitable for carrying because the size and weight of the display device increase.

Meanwhile, a flexible display that can be folded or rolled with sufficient elasticity has recently been developed, and when the flexible display is applied to a mobile terminal, the display may be expanded and used if necessary. By unfolding the display that is hidden inside the device or curled up into the back of the device, the front surface area of the display may be expanded, allowing a wider screen, if needed.

However, in order to expand the display, a structure for guiding an expansion of the display should be provided, and the structure occupies an additional space compared to an existing device. Therefore, there is a problem in that the arrangement of components of an electronic part provided in an existing apparatus is not appropriate.

In addition, there is a problem in that the display part cannot be stably unfolded due to the material characteristics of the flexible display part and the structure in which the front surface area of the display is variable.

DISCLOSURE OF INVENTION

Technical Goals

An aspect of the present disclosure is to secure a sufficient space for components of an electronic part to be positioned by efficiently providing a variable structure of the flexible display part.

Further, another aspect of the present disclosure is to solve the problem that the display is not evenly formed when the flexible display part is expanded or retracted.

Technical Solutions

According to an aspect, there is provided a roll-slide mobile terminal comprising a first frame, a second frame configured to slidably move in a first direction with respect to the first frame, a display part configured to be flexible, partially fixed on a front surface of the first frame, wound at an end portion in a first direction of the second frame, and provided over a rear surface of the second frame, wherein a front surface area is expanded or retracted in response to a movement of the second frame, a first guide rail fixed to the first frame and provided in a second direction parallel to the front surface area of the display part and perpendicular to the first direction, a first slider configured to move in the second direction along the first guide rail and a link rotatably fastened to each of the first slider and the second frame and configured to move the second frame according to a movement of the first slider.

According to another aspect, there is provided a roll-slide mobile terminal, wherein the first guide rail is provided to be biased toward an end portion of the first frame in the first direction.

According to another aspect, there is provided a roll-slide mobile terminal, wherein the second frame further comprises a roller provided at the end portion in the first direction to support a rear surface of the display part, and the roller comprises a rotational part configured to rotate in contact with the rear surface of the display part, and a fixed part that does not rotate and to which the link is fastened.

According to another aspect, there is provided a roll-slide mobile terminal further comprising a driving screw provided in parallel with the first guide rail and configured to rotate, and a screw hole formed in the first slider and engaged with the driving screw.

According to another aspect, there is provided a roll-slide mobile terminal, wherein the driving screw forms a screw having a rectangular cross section.

According to another aspect, there is provided a roll-slide mobile terminal further comprising a driving motor configured to rotate the driving screw, and a controller configured to transmit a driving signal to the driving motor according to an input signal for expanding or retracting the front surface area of the display part.

According to another aspect, there is provided a roll-slide mobile terminal, wherein, based on a cross section perpendicular to a moving direction of the first slider, the first guide rail forms guide surfaces provided on both sides of the first slider, and the guide surfaces include protrusions protruding towards the both sides of the first slider, and the first slider is provided between the first guide rails and includes depressions formed on the both sides corresponding to the protrusions.

According to another aspect, there is provided a roll-slide mobile terminal, wherein the depressions have triangular pyramid-shaped cross sections, and regarding an angle, two inclined surfaces of a triangular pyramid are perpendicular to each other.

According to another aspect, there is provided a roll-slide mobile terminal, wherein the first frame forms an electronic part that is provided on a side opposite to the first guide rail in the first direction.

According to another aspect, there is provided a roll-slide mobile terminal, wherein the link comprises a first pivot that is fastened on a side of the first guide rail, and a second pivot that is fastened on a side of the second frame, and the first guide rail, the first slider and the link are provided in pairs to be symmetrical with respect to a central axis parallel to the first direction of the first frame, and a distance between a pair of first pivots is greater than a distance between a pair of second pivots.

According to another aspect, there is provided a roll-slide mobile terminal, further comprising a second slider that is fixed to another side of the display part and configured to slidably move on the rear surface of the second frame according to an expansion or a retraction of the front surface area of the display part, a second guide rail that is formed on the rear surface of the second frame and configured to guide a movement of the second slider and a restoration spring configured to generate an elastic restoring force in a direction in which the front surface area of the display part is retracted by coupling the second frame and the second slider.

According to another aspect, there is provided a roll-slide mobile terminal, wherein the restoration spring is a windup spring of which a portion fastened to the second frame is spirally wound.

According to another aspect, there is provided a roll-slide mobile terminal, wherein the restoration spring is wound in a direction in which a spirally wound area increases when the front surface area of the display part is expanded.

According to another aspect, there is provided a roll-slide mobile terminal, further comprising a front cover configured to support a rear surface of the front surface area of the display part, wherein the first guide rail, the first slider and the link are positioned in an internal space formed between the front cover and the first frame.

Effects

A roll-slide mobile terminal of the present disclosure may selectively expand or retract a display part as needed.

In addition, since a bended point of a flexible display part is not limited to a specific part, durability of the flexible display part may be improved.

In addition, it is possible to prevent the entire device from becoming excessively large or thick by providing sufficient space for an electronic part while having an expansion structure of the flexible display part.

In addition, it is possible to easily maintain a flat state without bending or wrinkling an output area of the flexible display part.

Further scope of applicability of the present disclosure may become apparent from the following detailed description. However, it should be understood that specific embodiments such as detailed descriptions and example embodiments are given as mere examples since various changes and modifications within the spirit and scope of the present disclosure may be clearly understood by those skilled in the art.

BEST MODE FOR CARRYING OUT THE INVENTION

Hereinafter, the example embodiments disclosed herein will be described in detail with reference to the accompanying drawings, but regardless of the numbers of drawings the same or similar components refer to the same reference numeral, and redundant description thereof will be omitted. The suffixes "module" and "part" for the components used in the following description are given or mixed in consideration of the ease of writing the specification, and do not have distinct meanings or roles by themselves. In addition, in describing the example embodiments disclosed in the specification, if it is determined that detailed description of related known technologies may obscure the gist of the example embodiments disclosed in the specification, the detailed description thereof will be omitted. In addition, the accompanying drawings are only for easy understanding of the example embodiments disclosed in the specification, and the technical idea disclosed herein is not limited by the accompanying drawings, and all modifications included in the scope of the present disclosure should be understood to include equivalents or substitutes.

The terms such as "first" and "second" as used herein may use corresponding components regardless of importance or an order and are used to distinguish a component from another without limiting the components. These terms may be used for the purpose of distinguishing one element from another element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element.

A singular expression includes a plural expression unless the context clearly dictates otherwise.

The terms "have," "may have," "include," and "may include" as used herein indicate the presence of corresponding features (for example, elements such as numerical values, functions, operations, or parts), and do not preclude the presence of additional features.

Figure 1:
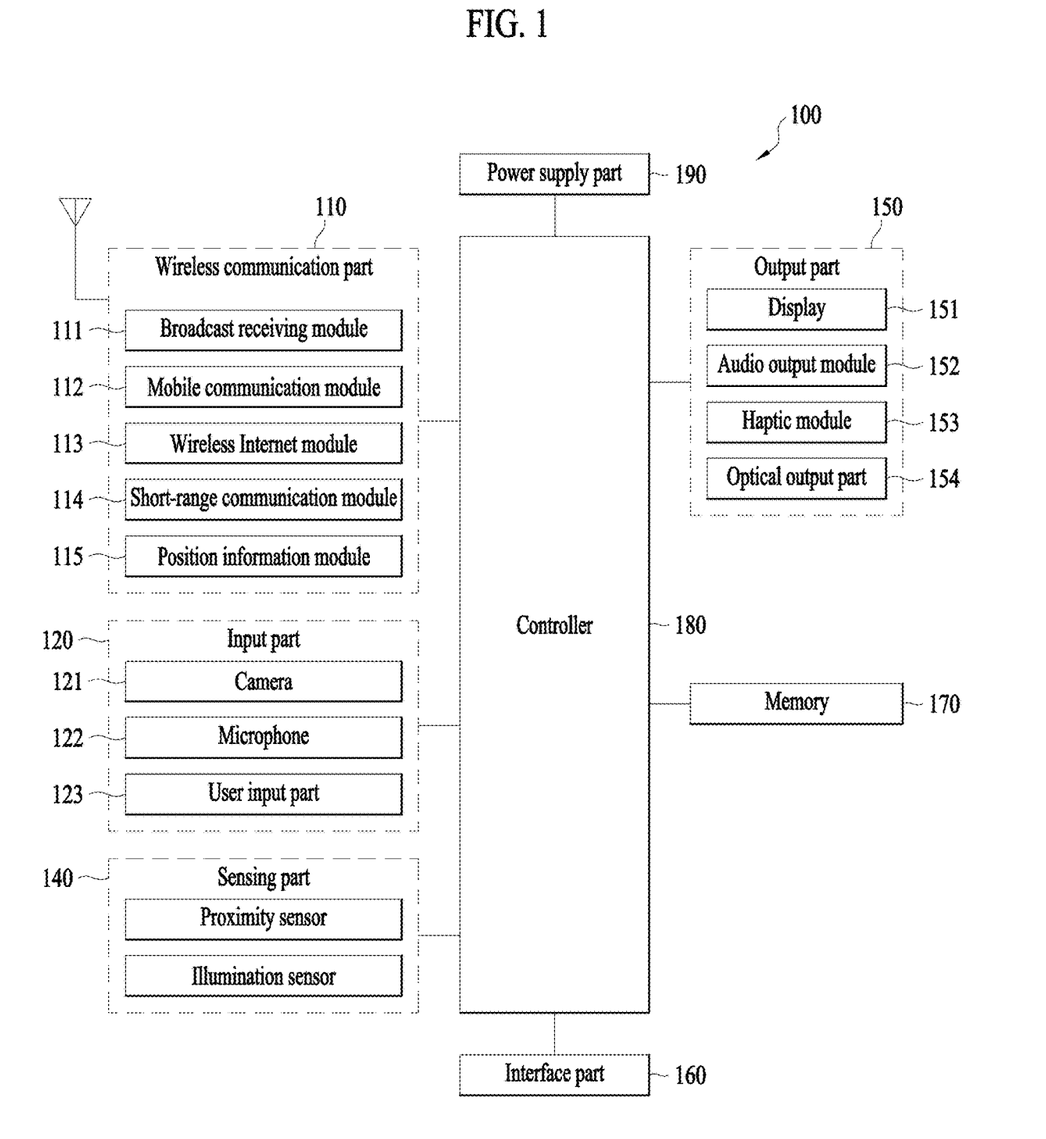
FIG. 1 is a block diagram illustrating a mobile terminal related to the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Further, the wireless communication unit 110 typically includes one or more modules which connect the mobile terminal 100 to one or more networks.

Such wireless communication unit 110 includes one or more of a broadcast receiving module 111, a mobile communication module 112, a wireless Internet module 113, a short-range communication module 114, and a location information module 115.

First, referring to the wireless communication unit 110, the broadcast reception module 111 of the wireless communication unit 110 receives a broadcast signal and/or broadcast related information from an external broadcast management server through a broadcast channel. The broadcast channel may include a satellite channel and a terrestrial channel. Two or more of the broadcast reception modules may be provided to the mobile terminal 100 for simultaneous broadcast reception or broadcast channel switching for at least two broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform any function of the other modules of the wireless communication unit 110 to obtain data on the location of the mobile terminal as a substitute or additionally. The location information module 115 is a module used to obtain the location (or current location) of the mobile terminal, and is not limited to a module that directly calculates or obtains the location of the mobile terminal.

The input unit 120 may be configured to permit various types of input to the mobile terminal 120. Examples of such input include audio, image, video, data, and user input. Image and video input is often obtained using one or more cameras 121.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

In addition, the controller 180 may control at least some of the components discussed with reference to FIG. 1 in order to drive an application program stored in the memory 170. Furthermore, in order to drive the application program, the controller 180 may operate at least two or more of the components included in the mobile terminal 100 in combination with each other.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

It is premised that the roll-slide mobile terminal 100 of the present disclosure is a bar shape, but it may be provided in another form within a range that does not contradict features of the present disclosure.

The roll-slide mobile terminal 100 of the present disclosure refers to the aforementioned mobile terminal to which a flexible display is applied. The flexible display refers to a display that may be bent so that a winding area may be varied.

The flexible display refers to a light and strong display that is not easily broken because it is manufactured on a thin and flexible substrate that may be curved, bent, folded, twisted or curled like paper while maintaining the characteristics of an existing flat panel display.

The flexible display may be combined with a touch sensor to implement a flexible touch screen. When a touch is made on the flexible touch screen, a controller may perform a control corresponding to the touch input.

The touch sensor detects a touch (or a touch input) applied to the touch screen by using at least one of various touch methods such as a resistive film method, an electrostatic capacitance method, an infrared method, an ultrasonic method and a magnetic field method.

As an example embodiment, the touch sensor may be configured to convert a change in pressure applied to a specific part of the touch screen or electrostatic capacitance generated in a specific part into an electrical input signal. The touch sensor may be configured to allow a touch object that applies a touch on the touch screen to detect a touch position on the touch sensor, an area, a pressure at the time of touch and electrostatic capacitance at the time of touch.

Further, the roll-slide mobile terminal 100 according to the modified example embodiment may be provided with a deformation detecting part configured to detect deformation of the flexible display. Such a deformation detecting part may be included in a sensing part.

The information related to the deformation may include a direction in which the flexible display is deformed, a deformation degree, a deformed position, a deformed time, and an acceleration at which the deformed flexible display is restored. In addition, the information may be various pieces of information detectable due to the curved flexible display.

In addition, based on the information related to the deformation of the flexible display detected by the deformation detecting part, the controller 180 may change information displayed on the flexible display, or generate a control signal that is to control a function of the roll-slide mobile terminal 100.

The state transformation of the flexible display (i.e., an expansion or a retraction of a front surface area) is not limited merely to a deformation by an external force. For example, the front surface area of the flexible display may be expanded or retracted by a command of a user or an application. In order to deform the flexible display without an external force as just described, a driving part may be included.

When the flexible display covers a rear surface as well as a front surface, a space in which an antenna implemented in an existing rear case may be mounted is limited. Therefore, the antenna may be implemented in the flexible display. An antenna on display (AOD) is a type of antenna in which a patterned electrode layer and a dielectric layer are layered to form a transparent film. The AOD may be implemented to be thinner than an antenna with laser direct structuring (LDS) technology implemented in the existing copper nickel-plating method, and accordingly the AOD has the advantage of not being exposed to the exterior with little effect on the thickness.

The above-described display part 151 may be implemented as a flexible display, and the flexible display part 151 refers to a set of a plurality of panels including the flexible display that directly perform an output function. For example, the flexible display part 151 may include a flexible display and a touch screen, and the aforementioned property of the flexible display, which is the deformable property, is likewise applied to the flexible display part 151. It is premised that the display part 151 to be referred to below is the flexible display part 151 unless otherwise specified.

Figure 2:
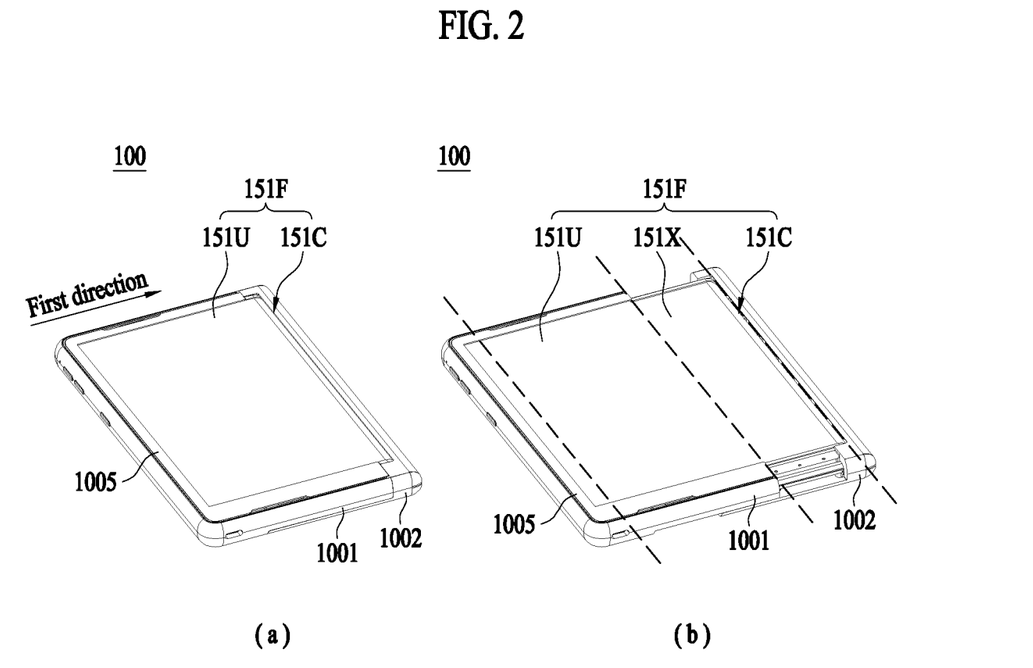
FIG. 2 illustrates front perspective views of a display part of a roll-slide mobile terminal according to another example embodiment of the present disclosure before and after it is expanded.
Figure 3:
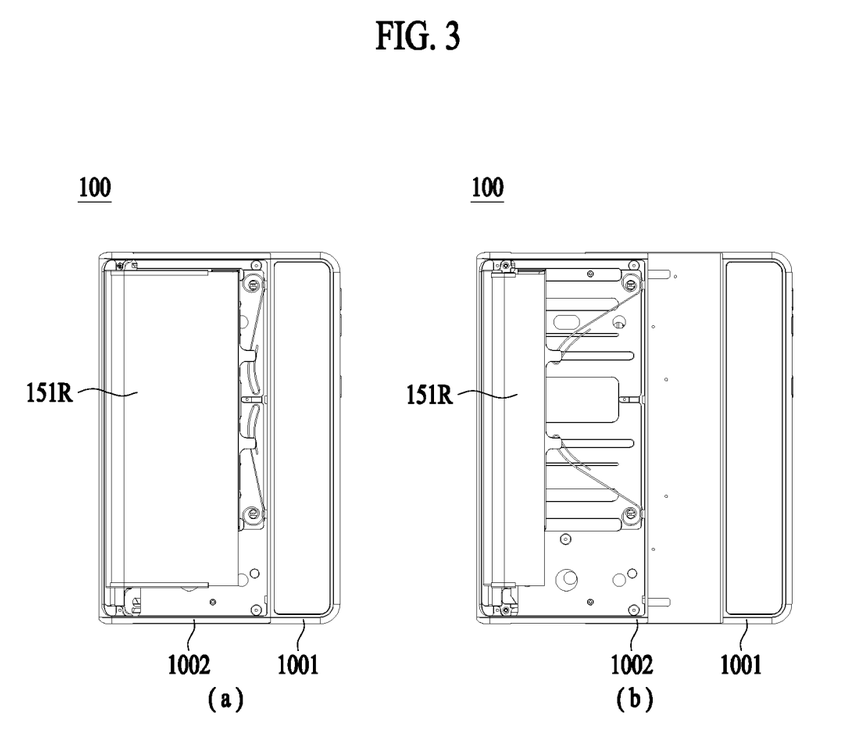
FIG. 3 illustrates rear views of a roll-slide mobile terminal before and after a display part is expanded according to an example embodiment of the present disclosure.
Figure 4:
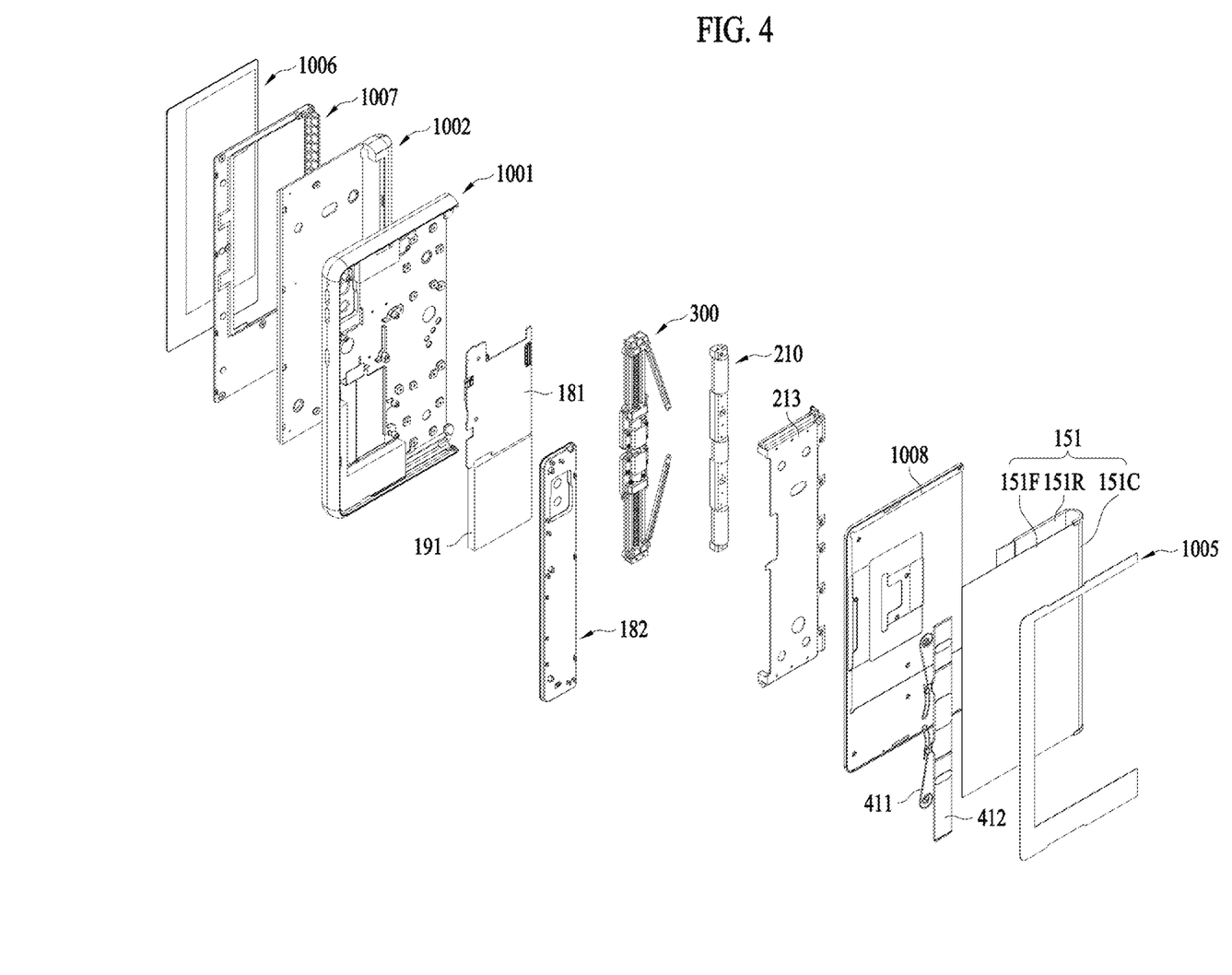
FIG. 4 is an exploded perspective view of a roll-slide mobile terminal.

FIG. 2 illustrates front perspective views, FIG. 3 illustrates rear views of the display part 151 of the roll-slide mobile terminal 100 according to an example embodiment of the present disclosure before and after it is expanded, and FIG. 4 is an exploded perspective view of the roll-slide mobile terminal 100.

The display part 151 may be provided with one side fixed in a front surface area with respect to the roll-slide mobile terminal 100 and wound at a corner in the first direction over a rear surface. A front surface area 151F of the display part 151 may be expanded, and in this case, a rear surface area 151R of the display part 151 is retracted. Conversely, when the front surface area 151F of the display part 151 is retracted, the rear surface area 151R of the display part 151 is expanded.

If a direction in which the front surface area 151F of the display part 151 is expanded is defined as a first direction, as the front surface area 151F becomes wider, a winding area 151C of the display part 151 moves in the first direction, and as the front surface area 151F of the display part 151 becomes narrower, the winding area 151C of the display part 151 moves in the direction opposite to the first direction.

In order to guide and support the expanded and retracted display part 151, a frame supporting the display part 151 is also expanded and retracted. With regard to the frame, include are a first frame 1001 and a second frame 1002 that slides with respect to the first frame 1001 in the first direction.

With regard to the front surface area 151F of the display part, an area continuously maintained regardless of an expansion and a retraction is defined as a fixed area 151U, and an area selectively exposed to the front according to the expansion or the retraction is defined as a variable area 151X. Based on a state where the front surface area 151F of the display part 151 is expanded, the fixed area 151U of the display part 151 is positioned in the first frame 1001 and the variable area 151X of the display part 151 is positioned in the second frame 1002.

When the second frame 1002 slidably moves in the first direction and it expands from the first frame 1001, the surface area 151F of the display part 151 also expands to expose the fixed area 151U and the variable area 151X to the front surface area. When the second frame 1002 slidably moves in the direction opposite to the first direction and it retracts from the first frame 1001, the front surface area 151F of the display part 151 is also retracted, leaving only the fixed area 151U.

The rear surface area 151R of the display part 151 may be exposed on a rear surface of the second frame 1002. The rear surface area 151R of the display part is covered by a rear window 1006 that is light transmissible so that the rear surface area 151R may be viewed from the outside.

A rear cover 1007 serves to cover a flexible structure in which the display part 151 moves on the rear surface of the second frame 1002, or to cover a second slider 412 and a second guide rail 413 to be described later, as much as possible.

Further, the front surface area 151F of the display part may be exposed to the front surface without a separate window. Meanwhile, a decorative frame 1005 may cover a boundary area between the front surface area 151F of the display part and the first frame 1001, so that the inflow of external substances may be prevented and the user's screen visibility may be helped by covering a bezel area of the roll-slide mobile terminal 100.

An electronic part may be formed in an internal space formed by external structures such as the first frame 1001 and the second frame 1002, and electronic components to drive the roll-slide mobile terminal 100, such as a battery 191, may be mounted on a main board 181 (main-PCB) and provided in the electronic part. Alternatively, there is a case where electronic components are provided directly in the electronic part without passing through the main board 181, like an electronic component such as an internal antenna module 182.

Figure 5:
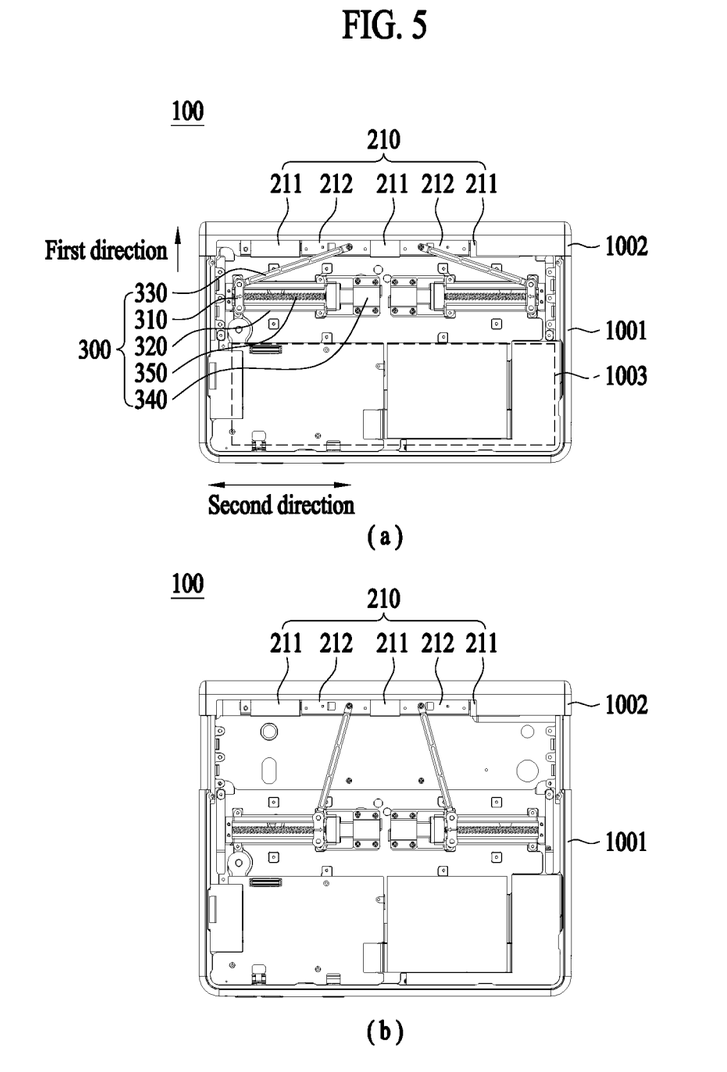
FIG. 5 illustrates partial front views of a roll-slide mobile terminal related to the present disclosure.

FIG. 5 illustrates partial front views of the roll-slide mobile terminal 100 related to the present disclosure. (a) of FIG. 5 illustrates a state before the front surface area 151F of the display part 151 is expanded, and (b) of FIG. 5 illustrates a state in which the front surface area 151F of the display part 151 is fully expanded. FIG. 4 is together referred for better understanding.

A roller 210 may be provided at an end portion of the second frame 1002 in the first direction to guide a movement (that is, an expansion or a retraction of the front surface area 151F of the display part 151) of the winding area 151C of the display part 151. The roller 210 may slide together with the second frame 1002 and rotate at the same time to respond to the movement of the winding area 151C of the display part 151. Through this, friction that may occur when the second frame 1002 expands or retracts the front surface area 151F of the display part 151 is minimized, and thus deformation and damage of the display part 151 are prevented.

The roller 210 includes a rotational part 211 having an outer surface in contact with the rear surface of the display part 151 to rotate, and includes a fixed part 212 that does not rotate since the fixed part 212 does not come into contact with the rear surface of the display part 151.

A roller-fastening member 213 serves as an intermediate so that the roller 210 may be coupled to the second frame 1002. That is, the roller 210 is positioned between the roller-fastening member 213 and the second frame 1002, is fixed by the both members, and slidably moves together. In particular, the roller fastening member 213 fixes the fixed part 212 of the roller 210 to be described later to the second frame 1002.

In order to slidably move the second frame 1002 in the first direction, the roll-slide mobile terminal 100 implements a linkage mechanism. A set of components to implement the linkage mechanism is defined as a linkage mechanism module 300.

The linkage mechanism module 300 may be positioned in an internal space formed between a front cover 1008 supporting the rear surface of the front surface area 151F of the display part and the first frame 1001.

The linkage mechanism module 300 largely includes a first slider 310 that moves in the first frame 1001, a first guide rail 320 that guides a movement of the first slider 310, and a link 330 hinged to the first slide and the second frame 1002 so that each of the both sides are rotatable respectively.

When the first slider 310 moves along the first guide rail 320, the link 330 rotates to adjust the distance between the first frame 1001 and the second frame 1002. In particular, the link 330 may be hinged to the fixed part 212 of the roller 210 of the second frame 1002. In this case, the link 330 pushes the fixed part 212 of the roller 210 in the first direction, and the roller-fastening member 213 fixed with the roller 210 and the second frame 1002 slidably move together in the first direction. As a result, the front surface area 151F of the display part is expanded, and at the same time, the front surface area 151F of the display part is naturally expandable without great friction due to the rotation of the rotational part 211 of the roller 210.

A direction parallel to the front surface area 151F of the display part 151 and perpendicular to the first direction is defined as a second direction.

By implementing a sliding movement of the second frame 1002 in the linkage mechanism manner, the first guide rail 320 may be provided in the second direction. That is, the direction of the movement may be changed not by pushing the second frame 1002 by a single member, but by pushing the second frame 1002 in combination of the first slider 310 and the link 330.

In particular, the linkage mechanism module 300 may be provided biased toward an end portion in the first direction of the first frame 1001. In other words, the linkage mechanism module 300 may be provided biased toward the opening direction of the second frame 1002. Conventionally, a single member had to move in the first direction to directly push the second frame 1002, it is required to secure a space for ensuring a stroke from the closed state to the opened state of the second frame 1002. However, when using the linkage mechanism module 300, the first slider 310 is provided on a side in the first direction to reciprocate in the second direction, and the link 330 moves in the first direction to push or pull the second frame 1002, thereby increasing the efficiency of the space. Accordingly, an electronic part 1003 having a sufficient size may be formed on the opposite side of the roll-slide mobile terminal 100 in the first direction.

The second frame 1002 may be moved by the driving of a driving motor 340. When a driving screw 350 is provided in parallel with the first guide rail 320, and a screw hole 312 of the first slider 310 is engaged with the driving screw 350, as the driving screw 350 rotates by the rotation of the driving motor 340, the first slider 310 may move in the second direction. The rotation of the driving motor 340 in one direction moves the second frame 1002 in one direction in which the front surface area 151F of the display part 151 expands, and the rotation of the driving motor 340 in the other direction moves the second frame 1002 in a direction in which the front surface area 151F of the display part 151 is retracted.

The controller may control the rotation of the driving motor 340. When an input signal regarding an expansion or a retraction of the front surface area 151F of the display part 151 is generated, the controller transmits the input signal as a driving signal to the driving motor 340 for rotation.

Figure 6:
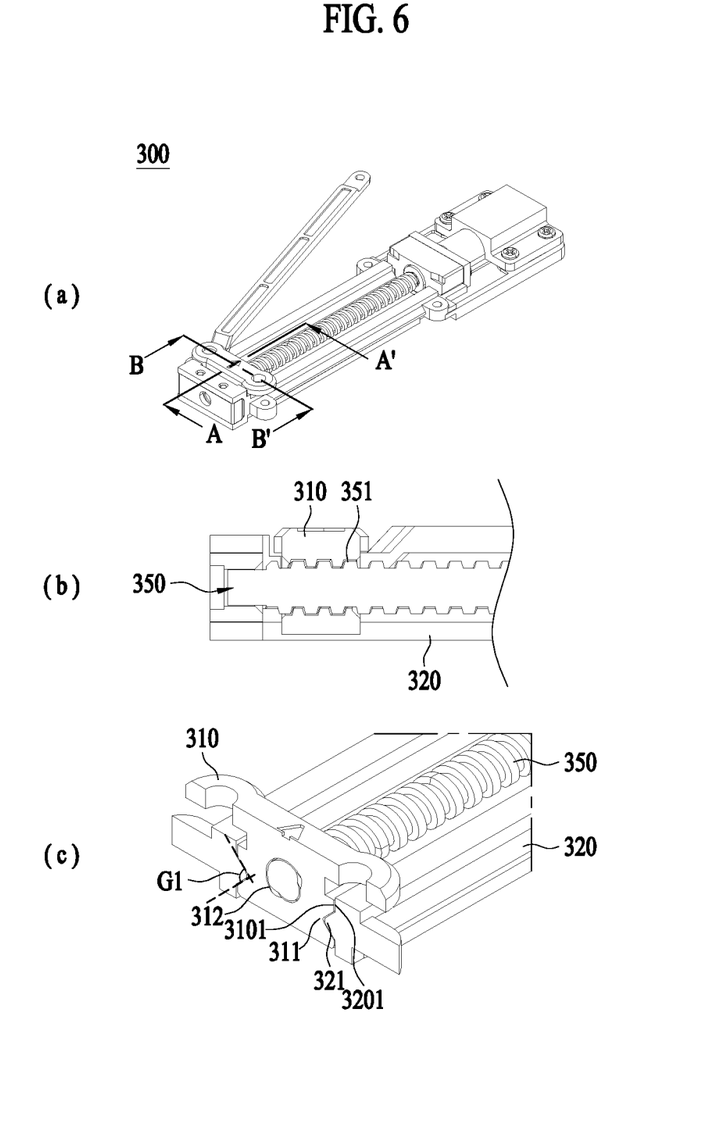
FIG. 6 illustrates a front perspective view of a linkage mechanism module of a roll-slide mobile terminal related to the present disclosure, and cross-sectional views taken along A-A' and B-B'.

FIG. 6 illustrates a front perspective view of the linkage mechanism module 300 of the roll-slide mobile terminal 100 related to the present disclosure, and cross-sectional views taken along A-A' and B-B'.

A cross section of a screw 351 between the driving screw 350 and the first slider 310 may be rectangular. This is to enable effective and stable force transmission from the driving screw 350 to the first slider 310. In this case, the quadrangle may have a trapezoidal shape in which the outer side of the driving screw 350 is shorter than the inner side, and this is to easily implement the mold of the driving screw 350.

Alternatively, the cross section of the screw 351 may be provided in a shape in which a semicircle protrudes (not illustrated). The screw 351 of the semicircle shape may minimize the problem of malocclusion by manufacturing tolerances.

Based on the cross section taken along B-B', which is a cross section perpendicular to the moving direction of the first slider 310, the first guide rail 320 may form guide surfaces 3201 provided on both sides of the first slider 310. Both side surfaces 3101 of the first slider 310 move along the guide surfaces 3201.

At this time, the guide surfaces 3201 have protrusions 321 protruding toward the both side surfaces 3101 of the first slider 310, and correspondingly, the both side surfaces 3101 of the first slider 310 may include depressions 311 corresponding to the protrusions 321 between the first guide rails 320. Due to the engagement of the protrusions 321 and the depressions 311, the slider moves only in the second direction and may not deviate in another direction.

In particular, the protrusions 321 may have a triangular pyramid-shaped cross section as illustrated in FIG. 6. The triangular pyramid-shaped cross section increases the ease of assembly by easily engaging the first slider 310 and the first guide rail 320 in the coupling process, and allows the first slider 310 and the first guide rail 320 to easily come into close contact, thereby reducing the possibility of occurrence of a gap. In this case, the angle G1 between the two inclined surfaces of the triangular pyramid may be vertical. The triangular pyramidal protrusion 321 having the inclined surfaces that are perpendicular to each other has a structurally stable shape to reduce the possibility of damage due to fatigue, and minimizes the possibility of the first slider 310 being separated.

Figure 7:
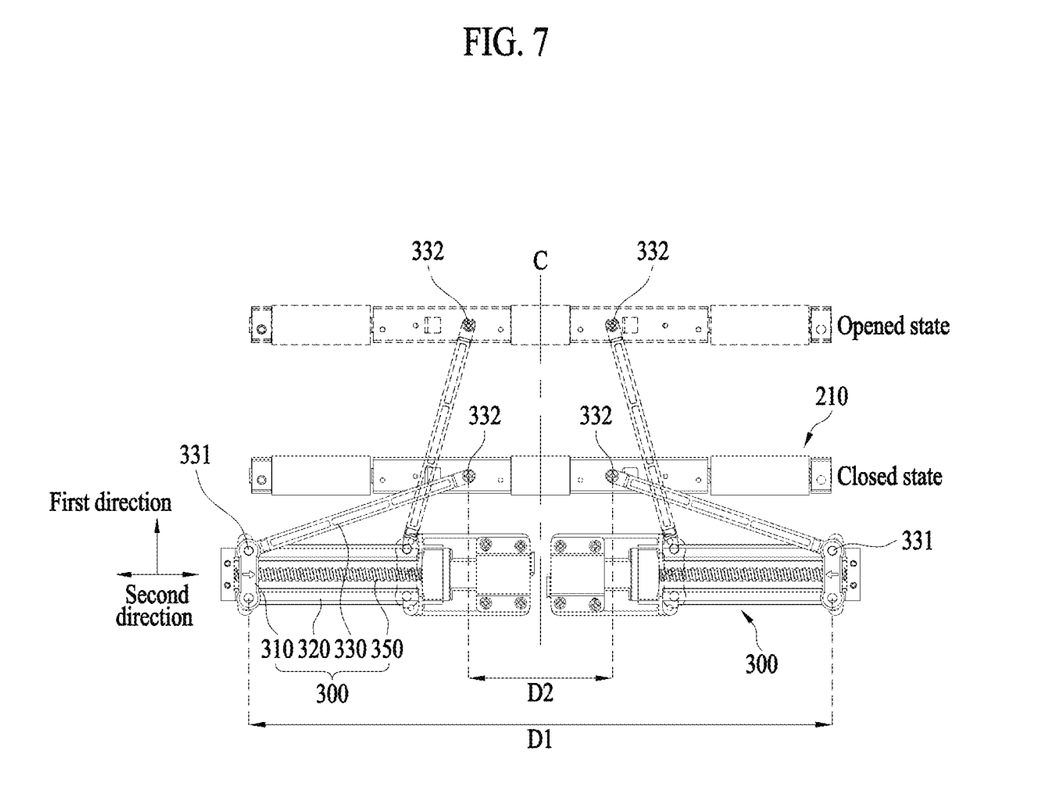
FIG. 7 illustrates linkage mechanism modules and rollers related to the present disclosure.

FIG. 7 illustrates the linkage mechanism modules 300 and the rollers 210 related to the present disclosure.

The linkage mechanism module 300 including the first guide rail 320, the first slider 310 and the link 330 may be provided in pairs to be symmetrical with respect to the central axis C of the roll-slide mobile terminal 100 parallel to the first direction. When the linkage mechanism module 300 is provided in pairs, it is possible to press or pull a uniform force to the roller 210 (or to the second frame 1002), thereby preventing damage from the load being concentrated or preventing jamming during movement.

As described above, the link 330 is rotatably hinged to the first guide rail 320 and the second frame 1002 (or the roller 210). The link 330 is fastened to the side of the first guide rail 320 through a first pivot 331 and is fastened to the side of the second frame 1002 through a second pivot 332. The first pivot 331 and the second pivot 332 may remain tilted in the same direction until the second frame 1002 moves from the closed state to the opened state.

In particular, the distance D1 between a pair of first pivots 331 may be greater than the distance D2 between a pair of second pivots 332. That is, when the second frame 1002 is opened, the link 330 may be made to stand upright on a side close to the central axis. The second pivot 332 may be connected to the fixed part 212, and the rotational part 211 may be widely distributed in each of the center and outer areas of the roller 210, and thus the second pivot 332 may be positioned close to the central axis avoiding the areas.

However, if necessary, on the contrary, when the distance D1 is shorter than the distance D2 and the second frame 1002 is opened, the link 330 may be made stand upright away from the central axis.

Further, for sufficient force transmission, the second pivot 332 may be provided as far as possible in the first direction. That is, as the second pivot 332 is provided as far as possible in the first direction, the inclination in the closed state becomes steeper, and thus among the forces transmitted by the first slider 310 to the link 330, a force in the first direction-component may increase.

Figure 8:
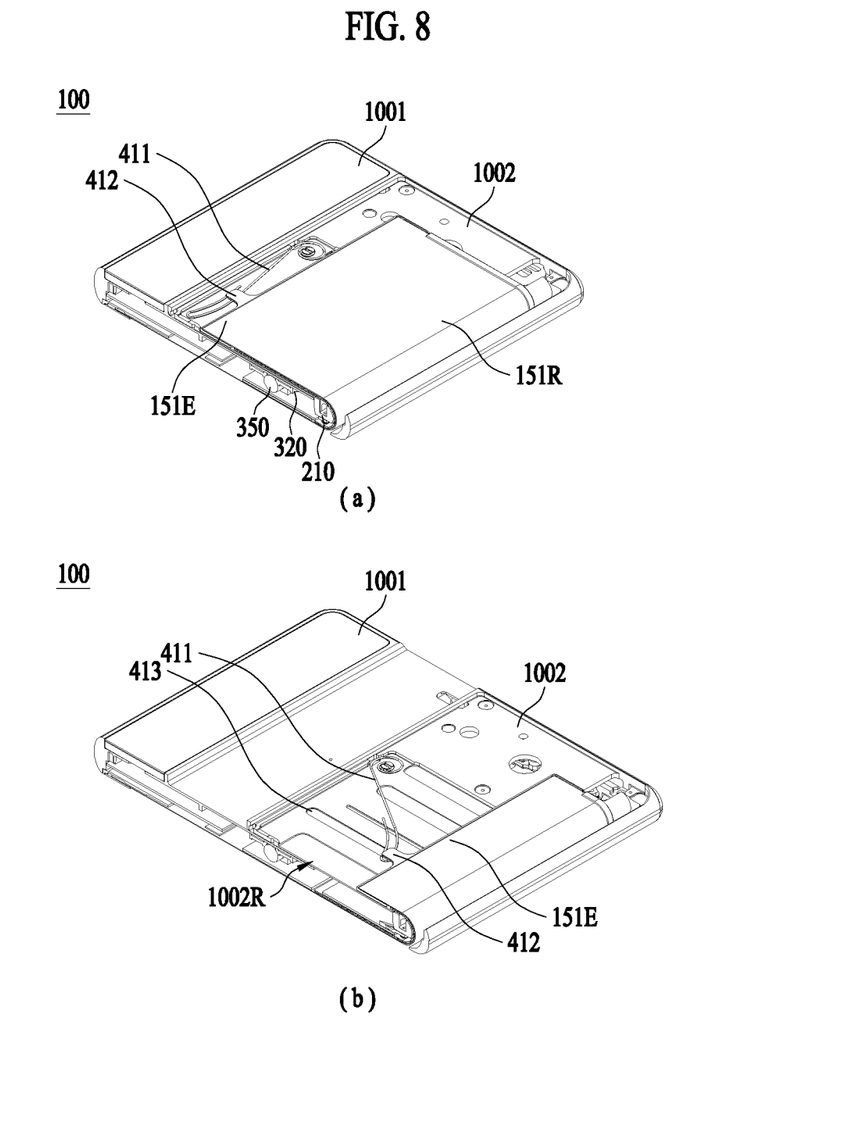
FIG. 8 illustrates rear perspective views showing a cross section of a roll-slide mobile terminal related to the present disclosure.

FIG. 8 illustrates rear perspective views showing a cross section of the roll-slide mobile terminal 100 related to the present disclosure. (a) of FIG. 8 illustrates a state before the front surface area 151F of the display part 151 is expanded, and (b) of FIG. 8 illustrates a state after the front surface area 151F of the display part 151 is expanded.

As described before, an expansion or a retraction of the front surface area 151F of the display part 151 is controlled by the sliding movement of the second frame 1002 or the roller 210 by the linkage mechanism module 300. However, the movement of the second frame 1002 or the roller 210 only moves the winding area 151C of the display part 151, and the display part 151 does not receive a pulling force from the both sides. Therefore, it is not possible to form an even surface, and bending or wrinkles may occur.

A restoration spring 411 may be used to prevent the occurrence of the wrinkles and to maintain the flatness of the display part 151. The restoration spring 411 connects the second frame 1002 and the display part 151 to generate an elastic restoring force that tries to approach each other to keep the display part 151 held taut.

When the front surface area 151F of the display part 151 is expanded, faster is the speed at which a rear surface of the display part 151 is reduced, or the seed at which an end portion area 151E of the display part 151 moves than the speed at which the second frame 1002 moves. Therefore, a point of the second frame's rear surface 1002R and the end portion area 151E of the rear surface area of the display part gradually diverge. The second slider 412 is fixed to the end portion area 151E of the rear surface area of the display part, and may slidably move on the second frame's rear surface 1002R. The second guide rail 413 configured to guide a movement of the second slider 412 is provided on the second frame's rear surface 1002R.

The restoration spring 411 compensates for the gap occurring because the moving speed of the second frame's rear surface 1002R and the moving speed of the rear surface of the display part 151 are not the same, and continuously pulls the display part 151 taut, and the second slider 412 is pulled by the restoration spring 411.

One side or an area of the one side of the display part 151 is fixed to the first frame 1001 on a front surface of the roll-slide mobile terminal 100, and the other side or an area of the other side of the display part 151 is fixed to the second slider 412 on a rear surface.

Figure 9:
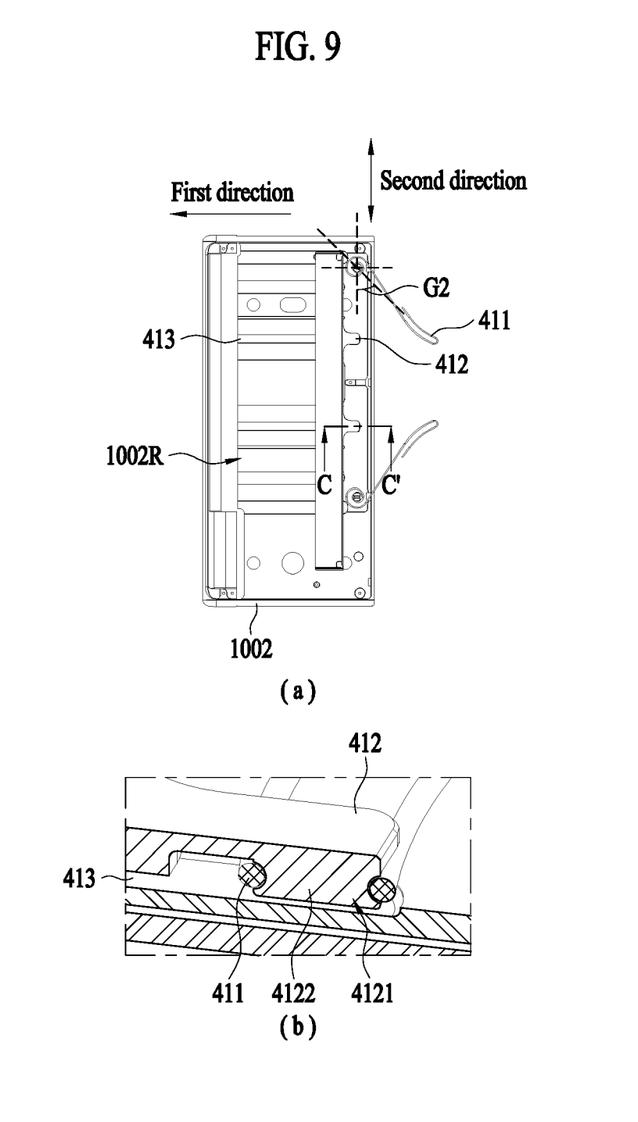
FIG. 9 illustrates a part of a rear surface of a roll-slide mobile terminal related to the present disclosure and a cross-sectional view taken along C-C' of the roll-slide mobile terminal related to the present disclosure.

FIG. 9 illustrates a part of a rear surface of the roll-slide mobile terminal 100 related to the present disclosure, and a cross-sectional view taken along C-C' of the roll-slide mobile terminal 100 related to the present disclosure.

The display part 151 is required to be continuously pulled taut regardless of an expansion or a retraction state of the front surface area 151F, and thus the restoration spring 411 is required to generate an elastic restoring force even when the second frame 1002 is fully closed. Therefore, in order to generate a certain amount of elastic restoring force even before a sliding movement of the second frame 1002, when the restoration spring 411 is fastened only to the second frame 1002 and is not fastened to the second slider 412, the restoration spring 411 may be positioned to be inclined in the direction opposite to the first direction. In particular, the angle G2 with respect to the second direction may have an inclination of about 0 to 45 degrees. It is because when the restoration spring 411 is provided bent too much, with an angle greater than 45 degrees for the above purpose, the process of fastening the restoration spring 411 to the second slider 412 may not be easy.

In order to secure a space in the roll-slide mobile terminal 100, the restoration spring 411 may be provided in the form of a windup spring of which a portion fastened to the second frame 1002 is spirally wound. In particular, the wound direction of the windup spring is the direction that the windup spring winds up more when the front surface area 151F of the display part 151 is expanded, so that the windup spring may not be unwound even when the second frame 1002 repeats the sliding movement.

The second slider 412 may include a fastening protrusion 4121 that is directly fastened to the second guide rail 413 and moves. The fastening protrusion 4121 may be provided to correspond to the width of the second guide rail 413, and forms an area to which the restoration spring 411 is fastened. Therefore, the fastening protrusion 4121 may have a concave shape 4122 dented in the thickness direction.

MODE FOR CARRYING OUT THE INVENTION

The above detailed description should not be construed as limiting in all aspects and should be considered as illustrative. The scope of the disclosure should be determined by reasonable interpretation of the appended claims, and all changes within the equivalent scope of the disclosure are included in the scope of the disclosure.

INDUSTRIAL APPLICABILITY

Some of or all the above-described features may be applied to the field corresponding to the mobile terminal, especially to the mobile terminal in which a display is expanded or retracted, related to the present disclosure.

The invention claimed is:

1. A roll-slide mobile terminal comprising:
a first frame;
a second frame configured to slidably move in a first direction with respect to the first frame;
a display part configured to be flexible, partially fixed on a front surface of the first frame, wound at an end portion in a first direction of the second frame, and provided over a rear surface of the second frame, wherein a front surface area is expanded or retracted in response to a movement of the second frame;
a first guide rail fixed to the first frame and provided in a second direction parallel to the front surface area of the display part and perpendicular to the first direction;
a first slider configured to move in the second direction along the first guide rail; and
a link rotatably fastened to each of the first slider and the second frame and configured to move the second frame according to a movement of the first slider,
wherein the second frame further comprises a roller provided at the end portion in the first direction to support a rear surface of the display part,
wherein the roller comprises:
a rotational part configured to rotate; and
a fixed part that does not rotate and to which the link is fastened,
wherein the link comprises:
a first pivot that is fastened on a side of the first guide rail and configured to move along the first guide rail; and
a second pivot that is fastened on the fixed part of the roller, and
the first guide rail, the first slider and the link are provided in pairs to be symmetrical with respect to a central axis parallel to the first direction of the first frame, and a distance between a pair of first pivots is greater than a distance between a pair of second pivots.

2. The roll-slide mobile terminal of claim 1, wherein the first guide rail is provided to be biased toward an end portion of the first frame in the first direction.

3. The roll-slide mobile terminal of claim 1, further comprising:
a driving screw provided in parallel with the first guide rail and configured to rotate; and
a screw hole formed in the first slider and engaged with the driving screw.

4. The roll-slide mobile terminal of claim 3, wherein the driving screw forms a screw having a rectangular cross section.

5. The roll-slide mobile terminal of claim 3, further comprising:
a driving motor configured to rotate the driving screw; and
a controller configured to transmit a driving signal to the driving motor according to an input signal for expanding or retracting the front surface area of the display part.

6. The roll-slide mobile terminal of claim 1, wherein, based on a cross section perpendicular to a moving direction of the first slider, the first guide rail forms guide surfaces provided on both sides of the first slider, and the guide surfaces include protrusions protruding towards the both sides of the first slider, and
the first slider is provided between the first guide rails and includes depressions formed on the both sides corresponding to the protrusions.

7. The roll-slide mobile terminal of claim 6, wherein the depressions have triangular pyramid-shaped cross sections, and regarding an angle, two inclined surfaces of a triangular pyramid are perpendicular to each other.

8. The roll-slide mobile terminal of claim 1, wherein the first frame forms an electronic part that is provided on a side opposite to the first guide rail in the first direction.

9. The roll-slide mobile terminal of claim 1, further comprising:
a second slider that is fixed to another side of the display part and configured to slidably move on the rear surface of the second frame according to an expansion or a retraction of the front surface area of the display part;
a second guide rail that is formed on the rear surface of the second frame and configured to guide a movement of the second slider; and
a restoration spring configured to generate an elastic restoring force in a direction in which the front surface area of the display part is retracted by coupling the second frame and the second slider.

10. The roll-slide mobile terminal of claim 9, wherein the restoration spring is a windup spring of which a portion fastened to the second frame is spirally wound.

11. The roll-slide mobile terminal of claim 10, wherein the restoration spring is wound in a direction in which a spirally wound area increases when the front surface area of the display part is expanded.

12. The roll-slide mobile terminal of claim 1, further comprising:
a front cover configured to support a rear surface of the front surface area of the display part,
wherein the first guide rail, the first slider and the link are positioned in an internal space formed between the front cover and the first frame.

* * * * *